US007448571B1

(12) United States Patent  (10) Patent No.: US 7,448,571 B1
Carter, Jr. et al.  (45) Date of Patent: Nov. 11, 2008

(54) ROTOR COLLECTIVE PITCH VS MU TO CONTROL FLAPPING AND MAST/ROTOR TILT TO CONTROL ROTOR RPM

(75) Inventors: Jay W. Carter, Jr., Burkburnett, TX (US); Jeffrey R. Lewis, Wichita Falls, TX (US)

(73) Assignee: Cartercopters, L.L.C., Wichita Falls, TX (US)

( * ) Notice: Subject to any disclaimer, the term of this patent is extended or adjusted under 35 U.S.C. 154(b) by 335 days.

(21) Appl. No.: 11/280,064

(22) Filed: Nov. 16, 2005

Related U.S. Application Data

(60) Provisional application No. 60/628,265, filed on Nov. 16, 2004.

(51) Int. Cl.
*B64C 27/52* (2006.01)
(52) U.S. Cl. ............................ 244/17.25; 244/6; 244/8; 244/17.11; 244/17.13
(58) Field of Classification Search .................... 244/6, 244/8, 17.11, 17.25, 17.13
See application file for complete search history.

(56) References Cited

U.S. PATENT DOCUMENTS

| 2,669,313 | A | * | 2/1954 | Lightfoot ........................ 416/1 |
| 3,322,375 | A | * | 5/1967 | Larson ........................ 244/181 |
| 4,730,795 | A | * | 3/1988 | David ............................ 244/6 |
| 4,980,835 | A | * | 12/1990 | Lawrence et al. ............... 701/4 |
| 5,301,900 | A | | 4/1994 | Groen et al. |
| 5,437,419 | A | * | 8/1995 | Schmitz .................... 244/17.11 |
| 5,478,029 | A | * | 12/1995 | Schmitz .................... 244/17.11 |
| 5,853,145 | A | | 12/1998 | Carter, Jr. |
| 6,024,325 | A | | 2/2000 | Carter, Jr. |
| 6,435,453 | B1 | * | 8/2002 | Carter, Jr. ........................ 244/8 |
| 6,527,515 | B2 | | 3/2003 | Carter, Jr. |
| 7,137,591 | B2 | * | 11/2006 | Carter et al. ............. 244/17.27 |
| 7,275,711 | B1 | * | 10/2007 | Flanigan .................. 244/17.11 |
| 2001/0050322 | A1 | * | 12/2001 | Carter, Jr. ................ 244/17.25 |
| 2002/0005455 | A1 | * | 1/2002 | Carter, Jr. ........................ 244/8 |

OTHER PUBLICATIONS

U.S. Appl. No. 10/782,353, filed Feb. 19, 2004, Carter, Jr.

* cited by examiner

*Primary Examiner*—Michael R. Mansen
*Assistant Examiner*—Valentina Xavier
(74) *Attorney, Agent, or Firm*—Bracewell & Giuliani LLP

(57) ABSTRACT

A method of operating a rotor aircraft involves measuring an airspeed of the aircraft and a rotational speed of the rotor. A controller determines a Mu of the rotor based on the airspeed of the aircraft and the rotational speed of the rotor. The controller varies the collective pitch of the rotor blades in relationship to the Mu, from an inertia powered jump takeoff, through high speed high advance ratio flight, through a low speed landing approach, to a zero or short roll flare landing. In addition as the rotor is unloaded and the rotor slows down, the controller maintains a minimum rotor RPM with the use of a tilting mast.

17 Claims, 8 Drawing Sheets

Pitch vs. Mu

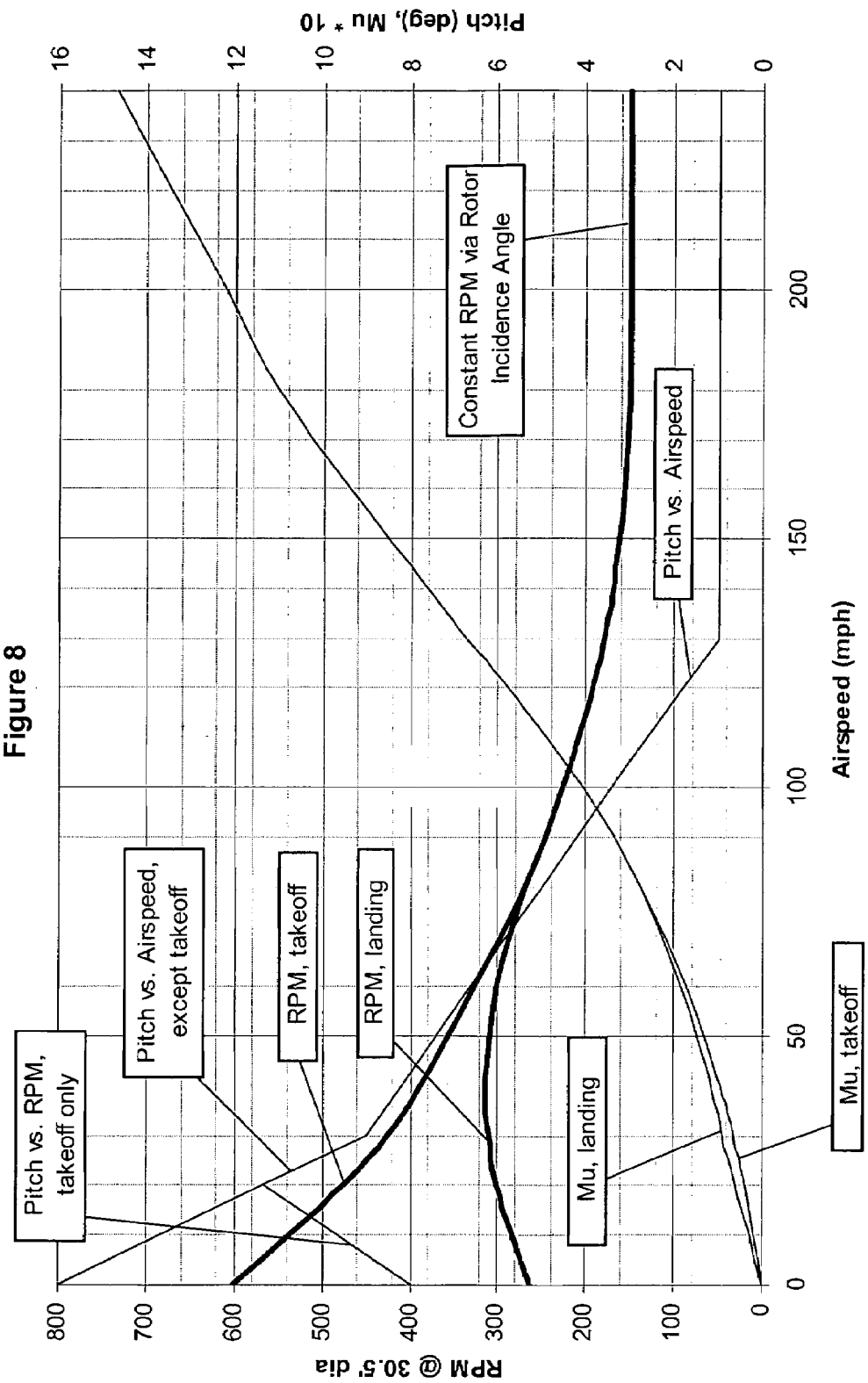

ROTOR COLLECTIVE PITCH VS MU TO CONTROL FLAPPING AND MAST/ROTOR TILT TO CONTROL ROTOR RPM

CROSS-REFERENCE TO RELATED APPLICATION

This application claims priority to provisional application Ser. No. 60/628,265, filed Nov. 16, 2004.

FIELD OF THE INVENTION

This invention relates in general to rotor aircraft, and in particular to an apparatus for automatically controlling the collective pitch of rotor blades throughout the flight, from an inertia powered jump takeoff, through high speed high advance ratio (Mu greater than about 0.7) flight, through a low speed landing approach, to a zero or short roll flare landing. The invention also relates to controlling the rotor RPM with the use of a tilting mast as the rotor is unloaded and the rotor slows down.

BACKGROUND OF THE INVENTION

One type of rotor aircraft has wings, a rotor and a means of forward thrust other than the rotor. The rotor provides most of the lift during short or vertical takeoffs, slow speed flight, and landings, and the wings provide most of the lift during cruise conditions. For a short or zero roll takeoff, the pilot pre-rotates the rotor to a selected speed. While pre-rotating, the pilot maintains the collective pitch near zero. The collective pitch refers to the angle of attack of the blades relative to the plane of rotation. At zero collective pitch, the leading and trailing edges of the blades are in a common plane with the plane of rotation.

When ready for liftoff, the operator releases the clutch driving the rotor so it freewheels and increases the collective pitch, which tilts the leading edge of each blade upward relative to the trailing edge. The rotor has tip weights to provide high inertia, and the inertia drives the rotor, which causes the aircraft to lift while a thrust means propels the aircraft forward. The operator gradually reduces the collective pitch as the aircraft picks up speed. The operator also decreases the aft tilt of the rotor, which reduces the air stream flowing through the rotor, thus decreasing the rotational speed. At cruising speeds and at an advance ratio greater than about 0.7, the collective pitch is generally between 1.5 and minus 0.5 degrees, and the rotor provides very little of the lift. The air stream flowing through the rotor causes the rotor to auto-rotate at a selected slow rotational speed. When landing, the operator tilts the rotor aft, which causes the rotor to speed up. The operator also increases the collective pitch when landing, causing the rotor to assume more of the lift required for the aircraft.

At high aircraft velocities, the rotor speed must be limited so that the tip velocity of the advancing rotor does not exceed the speed of sound. Because of this problem, the ratio of aircraft forward speed to rotor tip speed relative to the aircraft, known as the "advance ratio" or Mu, is limited to about 0.5 in helicopters and autogyros. A gyroplane as described above is able to achieve higher aircraft speeds by unloading the rotor and auto-rotating the rotor at a slow rotational speed, thus allowing the Mu to increase beyond that of conventional helicopters and autogryos.

Even though the rotor provides very little lift at cruising speeds, the advancing and retreating blades must provide equal lift moments about the rotor head. The advancing blade can only provide as much lift moment as the retreating blade. Once the rotor has been sufficiently unloaded by providing lift with the wings and propulsion by a source such as a propeller, the rotor blades continue to maintain lift moment equilibrium about the hub with rotor flapping. Rotor flapping is a mechanism by which the advancing and retreating blades can produce the same lift moments. In order to work, the blades must be free to pivot up and down relative to the hub. This free flapping allows the advancing blade, which if it has more lift due to a higher velocity across it than the retreating blade, to rise or flap up. As the advancing blade rises, the resultant flow angle across the blade drops and reduces its lift. The opposite occurs on the retreating blade. As the advancing blade goes up, the retreating blade drops since the blades are tied together and because the retreating blade is not producing as much lift as the advancing blade. As the retreating blade drops, the resulting angle of airflow across the blade goes up and increases its lift. The rotor will automatically increase flapping until the lift moments on the advancing and retreating blades are the same. This characteristic whereby the lift on the retreating blade increases as the blade drops works whether the air flows from the leading edge to the trailing edge or from the trailing edge to the leading edge And what allows the rotor to operate at advance ratios greater than 1.

Nevertheless, for stability, the rotor flapping must be kept within a selected range, such as about 1 to 4 degrees. U.S. Pat. No. 6,435,453 discloses that varying the collective pitch can control flapping. Decreasing the collective pitch decreases flapping. However, measuring flapping during flight is difficult because the rotor plane of rotation changes in a banked turn and because of rapid changes in air speed or gusts.

As the rotor RPM slows, the centrifugal force decreases until at some point there would not be enough centrifugal force to keep the relatively flexible rotor blades stable. Weight is added to the blade tips to allow the rotor to be slowed down as much as practical. U.S. Pat. No. 5,627,754 discloses that rotor RPM can be varied by tilting the rotor plane of rotation relative to the air stream and used a cyclic mixing arrangement whereby the length of the links controlling the rotor fore and aft movement could be varied. Instead of a cyclic mixing arrangement used in the previous patent to tilt the rotor, a tilting mast can be used once the rotor has been unloaded for high Mu flight.

Flying a gyroplane as described requires the operator to adjust the collective pitch from near zero, during pre-rotation, to a high level for takeoff and landing, and again to between 1.5 and minus 0.5 degrees at cruising speeds. Some skill must be acquired in order to properly adjust the collective pitch, and the operator must remain aware of the necessity of making the pitch changes. Also the operator must keep the rotor RPM from going too low whereby there would not be enough centrifugal force to the keep the rotor stable. In order to reduce the pilot workload and make the aircraft easier to fly, both the rotor flapping and RPM can and should be controlled automatically.

SUMMARY

In this invention, a controller is utilized for automatic control of the collective pitch at all airspeeds and rotor RPM once the rotor has been significantly unloaded by using a wing for lift and a jet or propeller for forward thrust. The true air speed of the aircraft is measured as well as the rotational speed of the rotor. These speeds are input to the controller, which then determines a Mu of the rotor and varies the collective pitch in relation to the Mu. And once the rotor RPM drops to its minimum RPM, the controller holds this rotor RPM by tilting the rotor mast fore and aft.

Up to a selected Mu level, such as 0.75, the controller decreases the collective pitch along a predetermined relation or curve as the Mu increases. After the selected level of Mu has been reached and Mu continues to increase, the controller maintains the collective pitch generally constant within a range from about 1.5 and minus 0.5 degrees The controller also varies the tilt of the rotor while above the selected Mu level to maintain a minimum rotational speed. By maintaining the proper rotational speed and controlling the collective pitch, the controller limits flapping within an acceptable degree.

BRIEF DESCRIPTION OF THE DRAWINGS

FIG. 8 is a notional graph showing the relationship between airspeed and rotor blade pitch, rotor RPM and Mu.

DETAILED DESCRIPTION OF THE INVENTION

Figure 1:
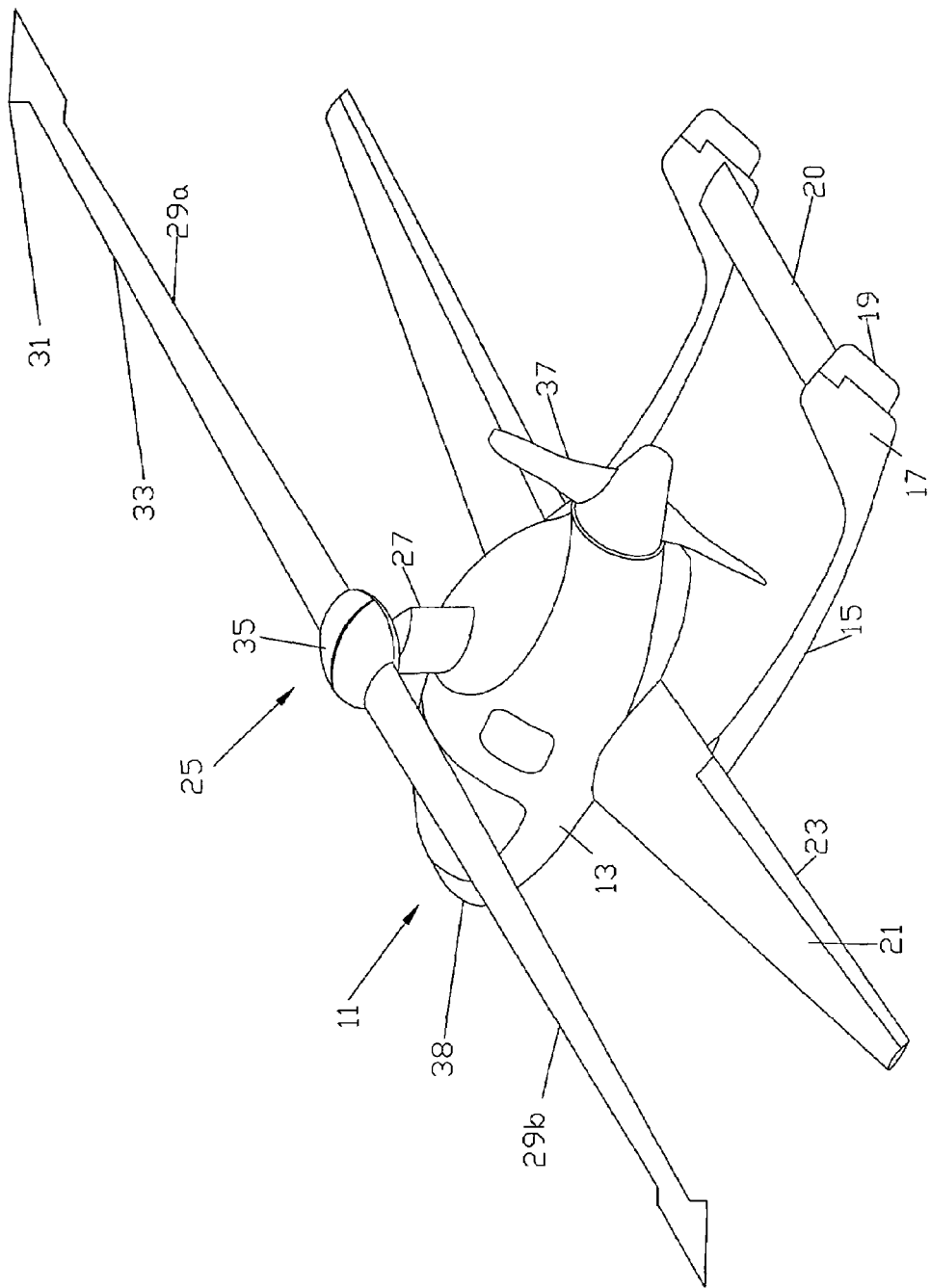
FIG. 1 is a perspective view of a gyroplane constructed in accordance with this invention.

Referring to FIG. 1, aircraft 11 is a gyroplane having a fuselage 13 with tail booms 15 in this example. A vertical stabilizer 17 is located at the end of each tail boom 15. A rudder 19 is mounted to the aft end of each vertical stabilizer 17. A movable stabilator 20 extends between the aft ends of tail booms 15.

Fuselage 13 has a pair of wings 21 that provide lift during forward flight. Each wing 21 has an aileron 23 in this embodiment. A rotor 25 is mounted above fuselage 13 on a mast 27. Rotor 25 is shown with two blades 29, but it could have more than two. During each revolution, one blade 29a becomes the advancing blade while the other blade 29b becomes the retreating blade. Blades 29 have tip weights 31 at their tips for providing inertia during take-off and stiffness during slow rotation at cruise speeds. Preferably tip weights 31 are forward of the leading edge 33 of each blade 29. Blades 29 join each other at a hub 35 at the upper end of mast 27. Preferably hub 35 is split into two halves movable relative to each other, with the shell of each blade 29 being integrally joined to one of the halves of hub 35.

Aircraft 11 has an engine (not shown) that powers rotor 25 for pre-rotation prior to takeoff. The engine also powers a propeller 37, which is shown as a pusher propeller but could also be a tractor type. Alternately, forward propulsion and rotation of rotor 25 could be provided by a jet engine. Aircraft 11 has a true airspeed sensor 38.

Figure 2:
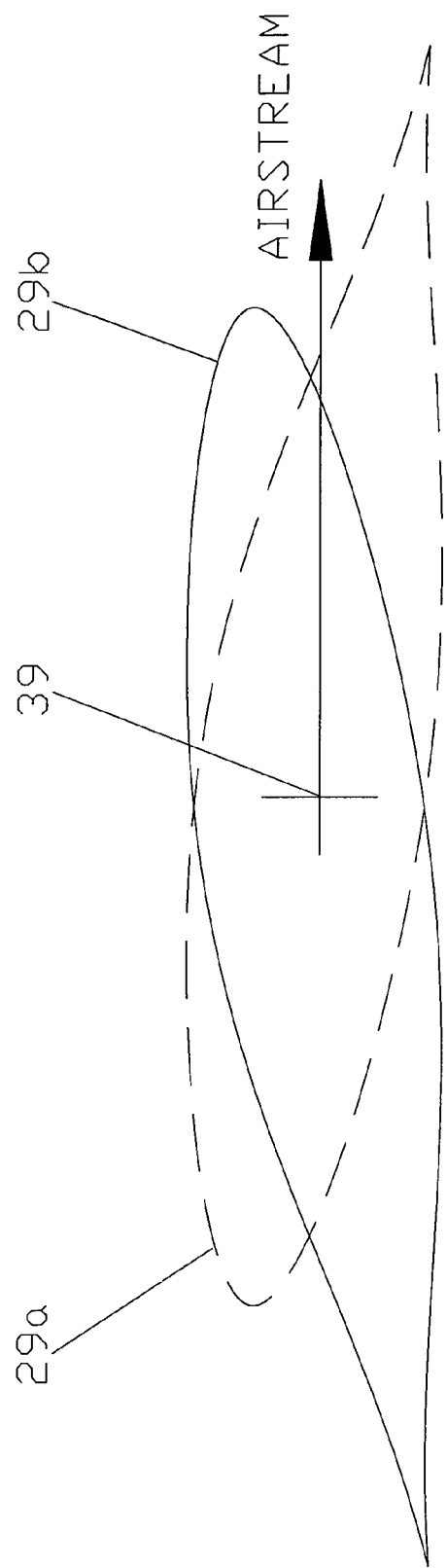
FIG. 2 is a schematic sectional illustration of the blades of the gyroplane of FIG. 1, one of the blades being shown in solid lines and the other blade shown in dotted lines, and the blades being illustrated at a positive collective pitch.

Referring to FIG. 2, blades 29 are movable relative to each other about a pitch axis 39 to vary the collective pitch. In the position shown in FIG. 2, each leading edge 33 of each blade 29 tilts upward or twists about pitch axis 39 to increase the collective pitch. An increase in collective pitch increases the angle of attack. If rotated or twisted about pitch axis 39 in the opposite direction, leading edge 33 will move downward to the plane of rotation. Rotor 25 produces greater lift when the pitch is at a high level, as shown in FIG. 2, than when the collective pitch is at a lesser level or zero.

Aircraft 11 (FIG. 1) is designed so that at short or vertical takeoffs and landings and slow speed flight, rotor 25 will produce a substantial part of the lift. At cruise flight speeds, rotor 25 will produce very little of the lift, rather the lift will be provided by wings 21. The collective pitch is adjusted from the high positive level shown in FIG. 2 to between 1.5 and minus 0.5 degrees at cruise speeds.

Figure 3:
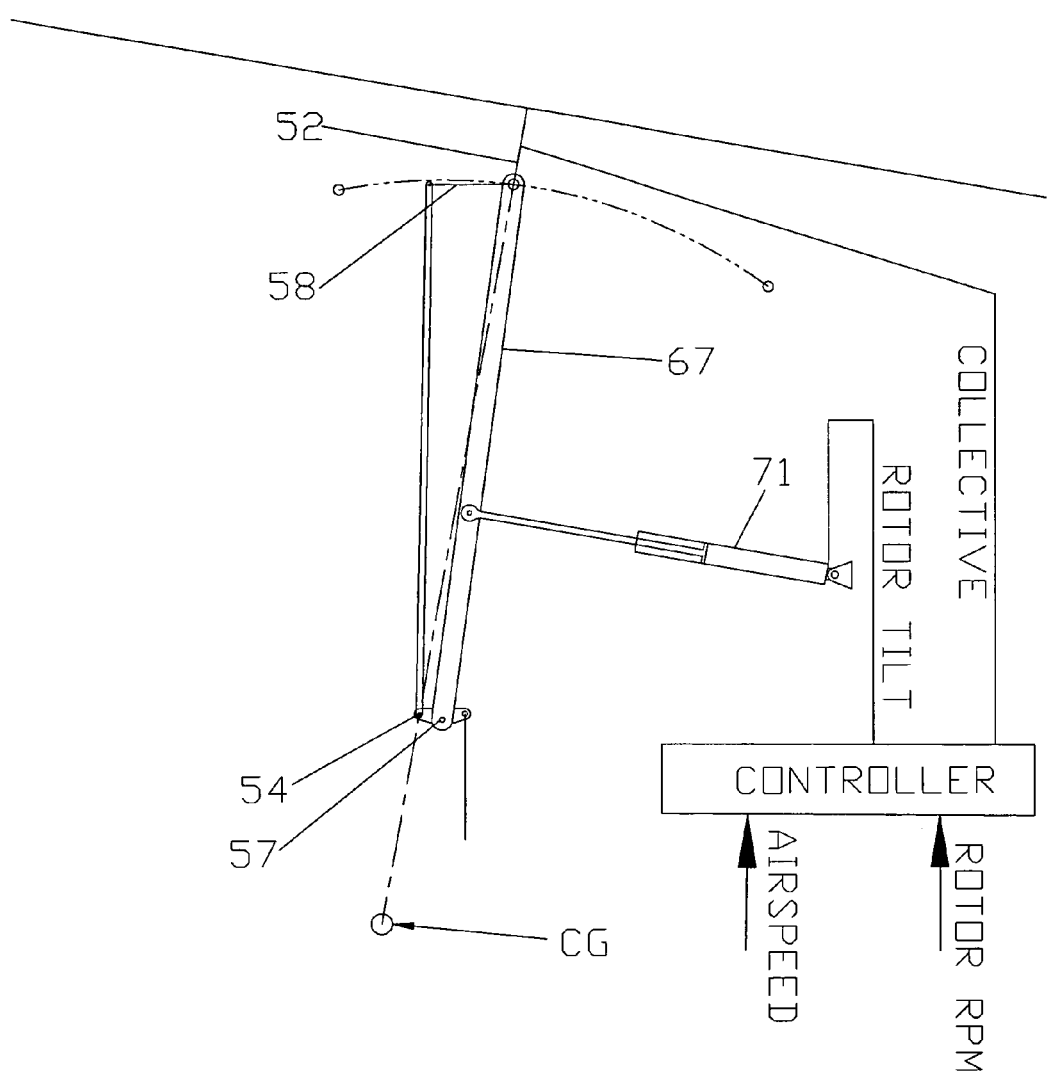
FIG. 3 is a schematic view of the tilt mechanism and the controller of the aircraft of FIG. 1.

FIG. 3 illustrates the components of the tilting mast 67. The mast pivot axis 57 is generally located above and aft of the aircraft CG (center of gravity). A lever arm 54 is pivotally mounted to mast 67 for cyclic pitch control, which refers to tilting the rotor plane of rotation relative to mast 67 in fore and aft and lateral directions. In this example, the rotor plane of rotation is tilted relative to mast 67 by a tilting spindle, which has an axis 52 spaced from a spindle arm 58 and is connected to lever arm 54. Mast 67 can be tilted as much as 25 degrees, but only in fore and aft directions. When mast 67 is tilted, spindle axis 52 and the rotor center of lift relative to the aircraft center of gravity (CG) remain essentially constant. This arrangement basically keeps the aircraft pitch from changing as mast 67 is tilted fore and aft. This arrangement also allows the rotor cyclic pitch relative to the airstream to change, which can control the rotor RPM once the rotor is unloaded and the rotor RPM has dropped to its minimum level. Mast 67 is driven in the fore and aft direction with a cylinder 71, which is mounted to fuselage 13 (FIG. 1).

Figure 4:
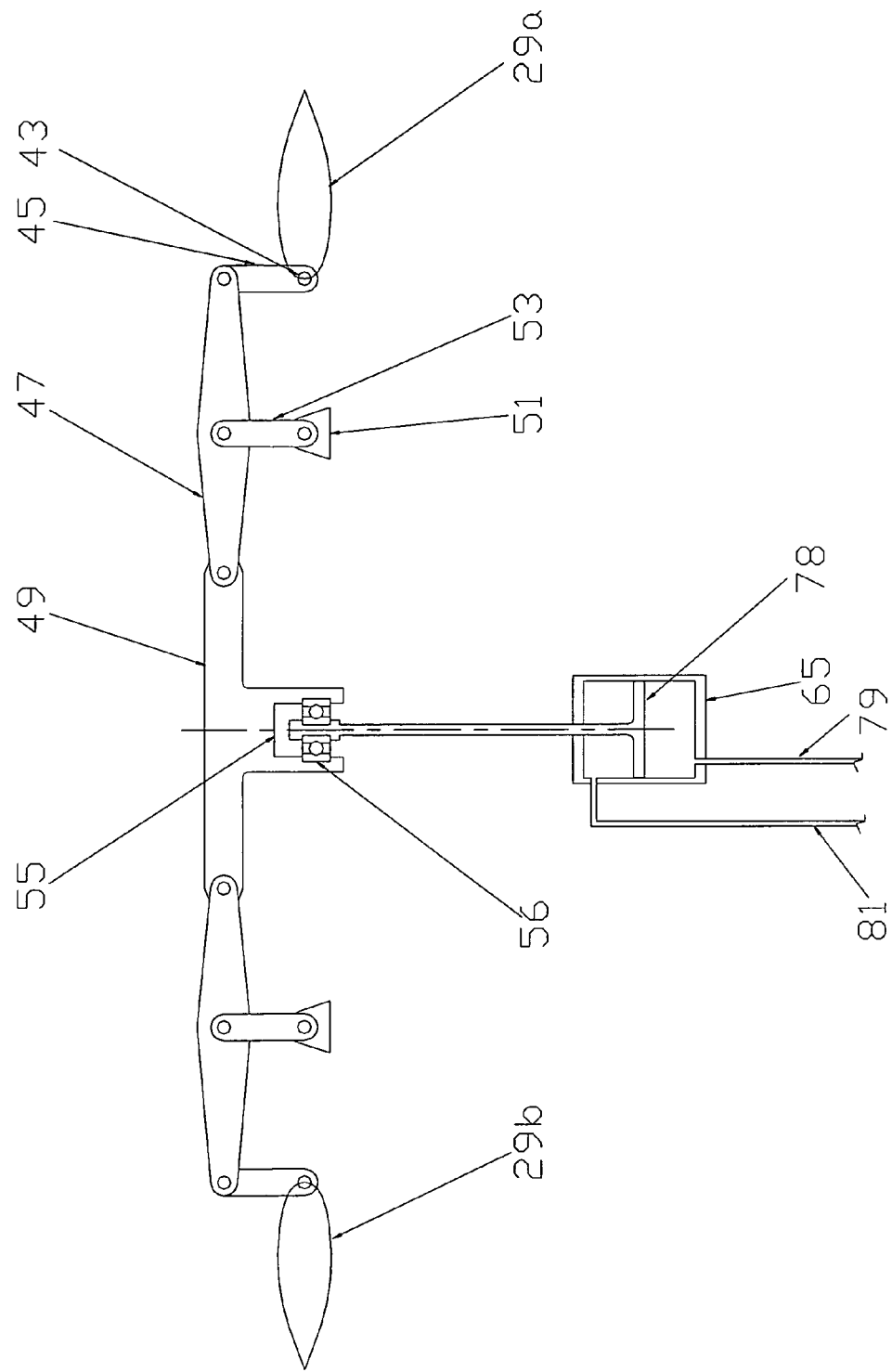
FIG. 4 is a schematic view of the collective mechanism.

FIG. 4 illustrates the components of one embodiment of the collective pitch assembly. Each blade is integrally joined to one of the hub half portions 35 (FIG. 1). A pitch horn 43 is secured to each blade 29. Each pitch horn 43 can be located either forward or aft of pitch axis 39. When moved up and down, each pitch horn 43 will rotate blade 29 about a twistable I beam type spar (not shown) and about pitch axis 39.

Each pitch horn 43 is pivotally connected to a push rod 45, which in turn is connected to a collective arm 47. Collective arm 47 is pivotally mounted to a collective tee 49. Collective tee 49 is able to reciprocate up and down relative to spindle (not shown). Links 53 are mounted to the spindle (not shown) at a point along each collective arm 47. When collective tee 49 moves downward, links 53 serve as fulcrums to cause push rods 45 and pitch horns 43 to move upward in unison. Similarly, when collective tee 49 moves upward relative to the spindle, pitch horns 43 move downward in unison.

The spindle is mounted to a rotatably driven shaft (not shown) through which extends an upper collective shaft 55. Collective tee 49 is mounted to the upper end of upper collective shaft 55 for upward and downward movement therewith. The spindle and cyclic pitch control mechanism is not shown, however it tilts the rotor in the fore and aft and lateral directions. A hydraulic cylinder 65 is located below the spindle and is non-rotating, but transfers its up and down movement through a thrust bearing 56.

In this embodiment, an automatic controller (FIG. 3), which is a computer, controls the collective pitch. Also, the controller will control fore and aft tilt of rotor 25 automatically to hold the minimum desired rotor RPM. A true air speed sensor 38 (FIG. 1) provides an input to the controller. A conventional rotor RPM sensor or tachometer also provides an input signal to the controller. The controller is programmed to provide outputs to collective pitch control hydraulic cylinder 65 and mast tilt cylinder 71.

Figure 5:
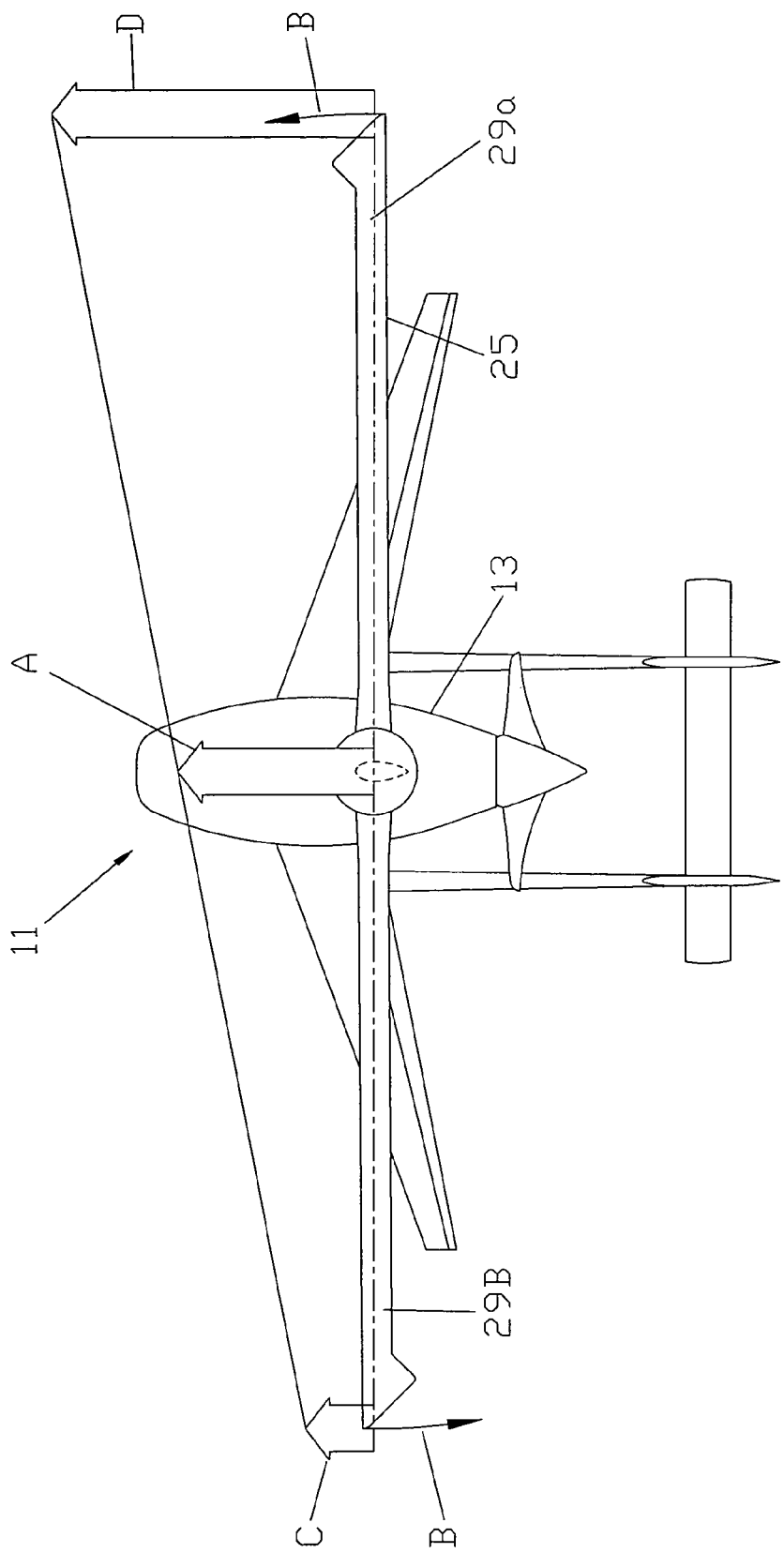
FIG. 5 is a schematic view as seen from above of the aircraft of FIG. 1, and illustrating a Mu greater than 1.0.
Figure 6:
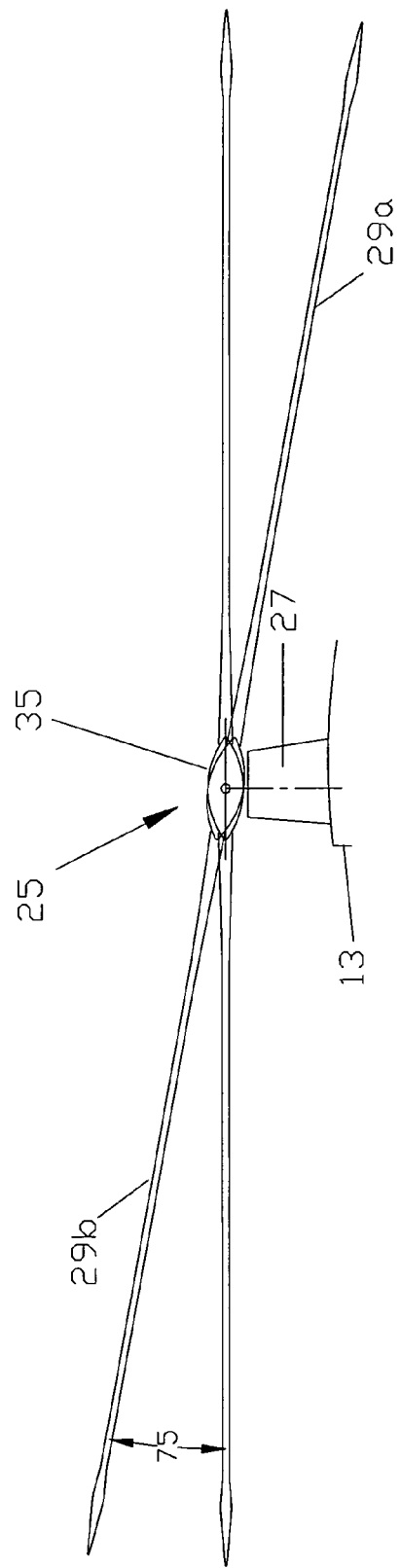
FIG. 6 is a schematic view as seen from one side of the rotor of the aircraft of FIG. 1, with the aircraft not being shown.
Figure 7:
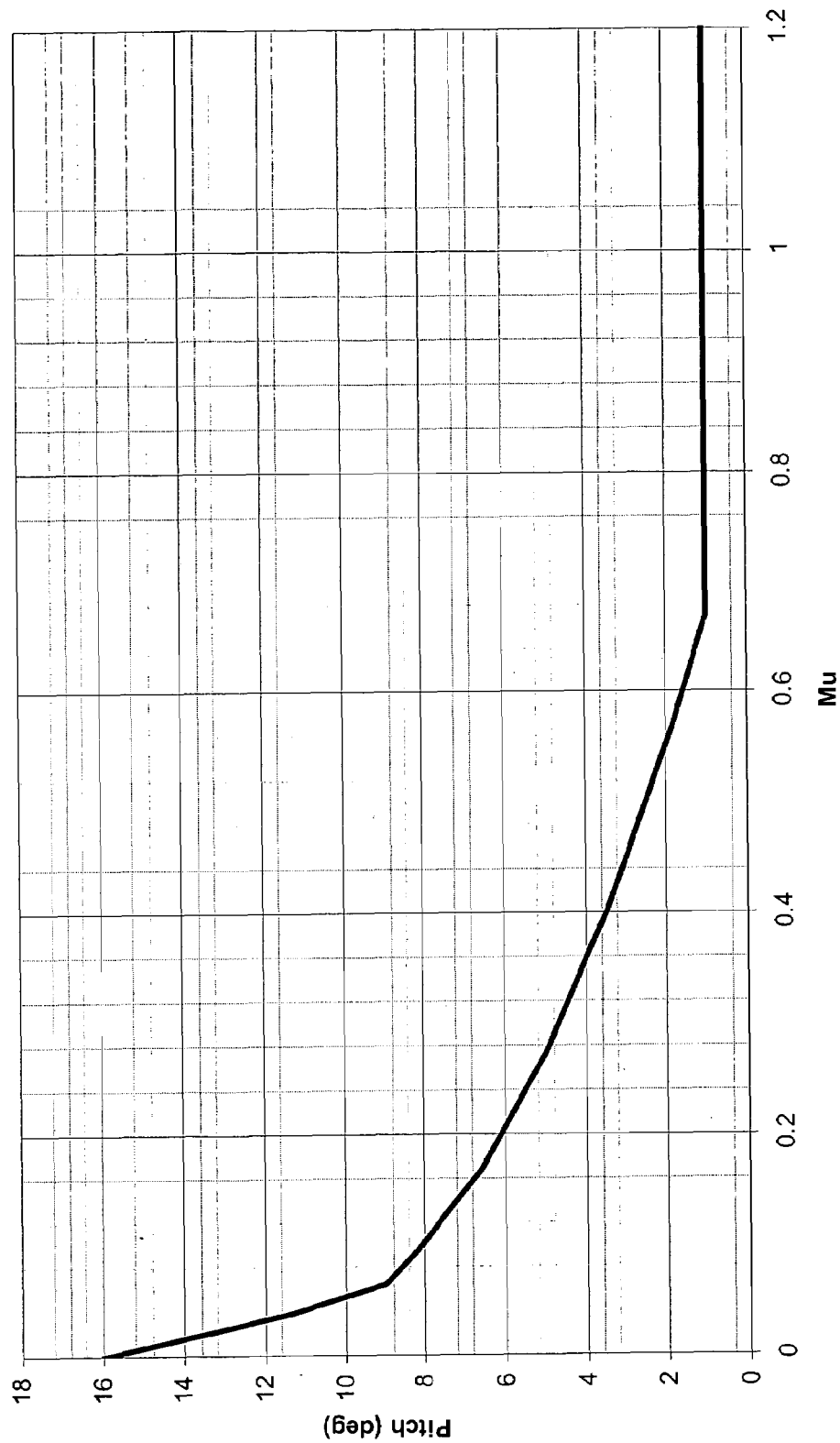
FIG. 7 is a graph of Pitch vs Mu

As discussed in the background of the invention above and schematically illustrated in FIGS. 5 and 6, flapping is a means by which the advancing and retreating blades 29a, 29b can achieve lift moment equilibrium, and is in general a function of Mu and lift. Mu is defined as the forward speed of the aircraft divided by the rotational tip speed of the rotor relative to the aircraft. Lift, with a resulting upward force, can be greatly altered by rotor pitch. For a given Mu, there is a range of blade pitches that will allow the rotor to auto-rotate while still providing the lift required without excessive flapping. These collective pitches can be calculated as well as determined empirically by test flights. In general, the controller varies the blade collective pitch as a function of Mu, such that at some Mu associated with a minimum straight and level forward speed such as 30 mph, Mu equals the highest blade pitch that will allow auto-rotation, such as 9 degrees. At a Mu greater than a selected amount, such as 0.75, the collective pitch will be low, such as 1.5 degrees positive to about minus 0.5 degree. Varying the collective blade pitch in accordance with this function will restrain blade flapping within a desired amount, such as approximately 1 to 4 degrees. FIG. 6 illustrates schematically the flapping angle 75. FIG. 7 illustrates an example of a curve or relationship between collective pitch and Mu that if utilized, will maintain flapping within the desired amount. Although termed "curve", the curve of FIG. 7 could be straight or curved. FIG. 8 shows the relationship between Mu and pitch in a different and more detailed manner, with the right side of the graph being both collective pitch and Mu. The units on the right side refer to degrees or to ten times Mu. For example, the unit 4 would be 0.4 Mu.

FIG. 5 illustrates aircraft 11 when flying at a Mu greater than 1. Rotor 25 is auto-rotating at a low rate of speed due to a shallow angle of attack relative to the air stream. Rotor 25 is rotating only at a high enough speed to produce enough centrifugal force to keep blades 29 stiff and stable, corresponding to a rotor tip speed between 150 and 250 ft/sec. The rotational speed is typically less than one-third the rotational speed employed at jump take-off, which may be at an RPM corresponding to a rotor tip speed of Mach 0.8 or more. At the slow tip speeds, with the rotor only producing a small percentage of lift, both the advancing blade 29a and retreating blade 29b can produce the same lift moments without stalling. At a Mu greater than 1.0, the entire air flow over retreating blade 29b is in reverse due to the high aircraft speed A and the slow speed of rotation. The rotational speed of rotor 25 results in a linear component B at the tip of each blade 29. The advancing blade will have a tip velocity D, which is the sum of aircraft velocity A and the rotational velocity component B. The velocity C of retreating blade 29b is equal to the aircraft velocity A less the rotational velocity component B. As a result, the entire flow over the retreating blade 29b is from the trailing edge to the leading edge when Mu is greater than 1.0.

In operation, referring to FIGS. 7 and 8, prior to pre-rotating rotor 25, the pilot preferably selects a take-off collective pitch for the controller to employ once the rotor clutch (not shown) is disengaged and the pilot is ready to take off. During a jump takeoff, the pilot rotates rotor 25 at near 0 degree collective pitch up to a higher than normal rotor 25 speed, such as a tip speed of Mach 0.8. Regardless of what the pilot selected, the controller holds rotor blades 29 at a zero or near zero collective pitch during pre-rotation to reduce the required horsepower. After the clutch is released, the controller increases the collective pitch to the pre-selected take-off pitch. [FIG. 7 shows the notional relationship between airspeed and rotor pitch, rotor RPM, and Mu. At any point on the Mu landing curve, one can determine the desired blade pitch by traveling vertically on the graph until one crosses the pitch vs airspeed curve. At that point travel to the right and read the corresponding blade pitch.]

The freewheeling rotor 25 lifts the aircraft until propeller 37 (FIG. 1) can provide sufficient forward speed to maintain flight. The combination of tip weights 31, blades 29 and the high pre-rotational speed for rotor 25 provides an adequate amount of stored energy to drive rotor 25 a sufficient amount after liftoff.

The pilot can select how aggressive a take-off is desired by the level of over speed of rotor 25 and the selection of take-off collective pitch. For example, if the pilot were to prefer a short rolling takeoff because he does not need to make a jump takeoff and he does not wish to take the time for the rotor to spin up to its maximum RPM, then the pilot may input an initial collective pitch between 5 and 9 degrees and pre-rotate rotor 25 to a lesser amount than maximum. For a maximum performance jump takeoff, rotor 25 RPM is increased to its maximum and collective pitch 23 is set to its maximum take-off setting, between 9 and 12 degrees.

The controller causes blades 29 to move to the selected or optimized take-off pitch immediately upon lift-off. However if an initial pitch setting would cause the rotor blade to see "critical Mach" (higher than normal drag) or the takeoff "g" forces to be excessive, then the controller could reduce the pitch to a lower value and then as the RPM decreased, increase the pitch as required to optimize the takeoff performance. Otherwise the controller will hold blades 29 at the desired take-off collective pitch or pitches, even if it is below the pitch vs Mu curve of FIG. 7. The selected pitch corresponds to a particular Mu on the Mu vs pitch curve of FIG. 7. When the actual Mu of the aircraft reaches the particular Mu, the controller will thereafter follow the pitch vs Mu curve until the aircraft has landed and the rotor clutch is engaged to prerotate the rotor for another take-off.

For example, if the pilot selects a take-off collective pitch of 6 degrees, the particular Mu corresponding to that take-off collective pitch on the curve of FIG. 7 is 0.2 At liftoff, the controller will thus hold the collective pitch at 6 degrees until Mu equals 0.2, then the controller will begin decreasing the collective pitch as Mu increases to follow the slope of the curve. For example when the actual Mu is about 0.4, the controller will move the collective pitch to approximately 3.5 degrees. The controller will actuate cylinder 65 (FIG. 3) to move collective tee 49 upward and downward relative to spindle axis 51 to maintain the pitch according to the curve of FIG. 7. As collective tee 49 moves upward, it causes push rods 45 and pitch horns 43 to move downward, decreasing the collective pitch.

If rotorcraft 11 has wings, such as wings 21 that produce lift, rotor 25 can be unloaded as wings 21 produce more lift after take-off. To reduce rotor lift and keep the net lift constant, the pilot pushes forward on the control stick (not shown), causing rotor 25 to tilt forward relative to the rotor mast or shaft 67. Moving the control stick forward also moves horizontal stabilizer 20 (FIG. 1) to pitch the aircraft 11 down. The control stick normally does not cause mast 67 to tilt, rather this is accomplished by the controller, unless overridden by the pilot. While rotor 25 is still producing some of the lift, the controller may move tilting mast 67 with tilt cylinder 71 (FIG. 3) as required to keep wings 21 (FIG. 1) operating at their best L/D (lift over drag) angle of attack until the minimum rotor RPM is reached. When rotor 25 is substantially unloaded and all of the required lift is supplied by wings 21, the controller causes cylinder 71 to tilt mast 67 to maintain this minimum RPM. Note the pilot could manually increase this minimum RPM of rotor 25 by cyclic pitch control if improved control response is desired, such as might occur during a military action to avoid harm.

As rotor 25 is tilted forward, there is less air flowing through rotor 25 to drive it, causing it to slow down. This lower RPM of rotor 25 and/or an increase in airspeed of aircraft 11 causes a corresponding increase in Mu, which may cause the controller to decrease collective blade pitch if the Mu is still below the upper region, which begins approximately 0.7 as indicated in FIG. 7. Likewise if Mu drops below the upper region, then the controller will increase collective pitch to maintain the relationship on the curve of FIG. 7. By programming the Mu versus collective pitch curve of FIG. 7 into the controller, flapping angle 75, illustrated in FIG. 6, is maintained within a safe operating range of preferably between 1 and 4 degrees.

The relationship between the tilt of rotor 25 and horizontal stabilizer 20 (FIG. 1) can be set so that when Mu is at a selected upper level, such as about 0.75, the airspeed will be such that wings 21 provide most of the lift. Preferably, as Mu increases above this upper level point, the rotor blade collective pitch remains substantially constant in the 1.5 degree to minus 0.5 degree range, as illustrated in FIG. 7. As the aircraft air speed increases and the pilot pushes the control stick forward to keep from climbing, the tilt of rotor 25 relative to the airstream will decrease, causing the rotor RPM to continue to drop. The relationship between airspeed and rotor RPM can be observed in FIG. 8.

In the preferred embodiment, as mentioned, the controller also operates to trim rotor 25 in the fore and aft directions by tilting mast 67 to maintain the rotor RPM at a selected minimum value regardless of the Mu. The controller will provide input to cylinder 71 to increase and decrease the rotor tilt (mast tilt) and thus the rotational speed of rotor 25 to keep the rotor speed at its minimum level during high speed forward flight.

As the aircraft slows down for landing, the pilot tilts rotor 25 aft as required to maintain lift, which increases the speed of rotor 25. Both decreasing speed and increasing rotor RPM decreases Mu. As previously mentioned, there is an upper Mu level of about 0.75 above which the controller maintains the collective pitch generally constant. When operating below this upper level of Mu, the controller will increase the collective pitch in response to a decrease in Mu according to the curve of FIG. 7 until the aircraft lands.

In summary, Mu is the ratio of the forward speed of the aircraft divided by the tip speed of the rotor relative to the aircraft. In general changes in airspeed or rotor RPM effects the value of Mu. Collective pitch refers to twisting of the rotor blades, each about its pitch axis. The controller operates on a collective pitch vs Mu curve to control flapping within safe desired limits. Above a Mu of approximately 0.75, the controller maintains the collective pitch generally constant between approximately 1.5 and −0.5 degrees, which still keep the flapping within safe limits.

Cyclic pitch changes refer to tilting the rotor relative to the mast by manual movement of the pilot control stick. The rotor can also be tilted by tilting the entire mast, and the tilting is normally performed by the controller. The tilting mast has dual purposes. First the controller controls the tilting mast to maintain the wings at the best angle of attack when the rotor is providing sufficient lift. Afterward, when the rotor is substantially unloaded, which is at Mu values greater than about 0.75, the controller maintains the rotor at its desired minimum RPM by varying the mast tilt. Rotor RPM is thus controlled at all airspeeds by varying the rotor tilt relative to the airstream, first with cyclic pitch control controlling the fore and aft tilt and then with mast tilt.

Should the pilot wish to increase the minimum rotor RPM, then the pilot could change the controller to maintain a higher minimum rotor RPM through more mast tilt, which takes priority over the controller's responsibility to hold the wing at its best L/D angle. Increasing the minimum rotor RPM increases rotor lift and drag, but might be needed to increase the aircraft control response, such as during a military action.

The invention has significant advantages. By automatically controlling the rotor pitch in relation to Mu, the pilot is freed of the need for blade pitch adjustments during takeoffs, slow and high speed cruise and landings. Also, the pilot is freed of having to control the tilt of the mast at lower speeds to control aircraft pitch and keep the wing operating at its best L/D angle of attack, and at higher aircraft speeds to control the minimum rotor RPM. Making the controller control the collective pitch in relation to Mu is easily performed as it does not require any actual measurement of flapping. The Mu versus collective pitch curve can be set for various aircraft by calculations and/or testing.

While the invention has been shown in only one of its forms, it should be apparent that it is not so limited but susceptible to various changes without departing from the scope of the invention. For example, although shown to be a gyroplane, the invention could also be applicable to a helicopter, gyroplane or a heliplane with hovering capabilities. Additionally, the collective mechanism is shown for a tilting spindle cyclic control that is not driven during flight, but it could be changed for a swash plate cyclic control, which would allow the rotor to be driven during flight.

The invention claimed is:

1. A method of operating a rotor aircraft, comprising:
   (a) measuring the true airspeed of the aircraft;
   (b) measuring a rotational speed of the rotor;
   (c) determining a Mu of the rotor based on the true airspeed of the aircraft and the rotational speed of the rotor;
   (d) varying a collective pitch in relation to the Mu; and
   wherein step (d) comprises determining a Mu vs collective pitch curve, programming a controller with the curve, then with the controller, varying the collective pitch in accordance with at least a portion of the curve.

2. The method according to claim 1, wherein step (d) further comprises:
   tilting a mast of the rotor in fore and aft directions to maintain a desired rotational speed of the rotor.

3. The method according to claim 1, wherein step (d) further comprises:
   at take-off of the aircraft, maintaining the collective pitch at a substantially constant take-off collective pitch; comparing the take-off collective pitch to the increase in actual Mu as the aircraft leaves the ground, then
   when the actual Mu exceeds the Mu that corresponds to the take-off collective pitch as observed on the curve, decreasing the collective pitch in accordance with at least a portion of the curve.

4. The method according to claim 1, wherein step (d) further comprises decreasing the collective pitch as the Mu increases up to a selected upper level of Mu, then maintaining the collective pitch substantially constant as Mu increases beyond the selected upper level.

5. The method according to claim 4, further comprising:
   above the selected upper level, tilting the rotor fore and aft to maintain a selected minimum rotor RPM level, whereby tilting the rotor aft increases the rotor RPM and tilting the rotor forward decreases the rotor RPM.

6. The method according to claim 1, wherein the aircraft has wings that provide substantially all of the lift required for the aircraft when reaching cruise conditions, and wherein the method further comprises:
prior to reaching cruise conditions and when the rotor is still providing a significant portion of lift for the aircraft, automatically tilting a mast of the rotor to maintain a desired angle of attack for the wings; and
when at cruise conditions, automatically tilting a mast of the rotor in fore and aft directions to slow the rotor and maintain the rotor at a selected RPM.

7. The method according to claim 1, wherein step (d) further comprises:
at take-off of the aircraft, maintaining the collective pitch at a substantially constant take-off level collective pitch; and
when the Mu of the rotor exceeds the take-off level collective pitch corresponding to the Mu vs collective pitch curve, decreasing the collective pitch in a selected relationship with Mu as the Mu continues to increase; then
at a selected upper level of Mu, maintaining the collective pitch substantially constant as Mu increases more than said upper level.

8. A method of operating a rotor aircraft, comprising:
(a) measuring the true airspeed of the aircraft;
(b) measuring a rotational speed of the rotor;
(c) determining a Mu of the rotor based on the true airspeed of the aircraft and the rotational speed of the rotor;
(d) varying a collective pitch in relation to the Mu; and wherein:
step (d) comprises determining a Mu vs collective pitch curve that limits flapping to a selected range for each Mu, programming a controller with the curve, selecting a desired take-off level collective pitch, then with the controller:
determining a higher Mu level on the curve that corresponds to the take-off collective pitch,
at take-off of the aircraft, maintaining the collective pitch at a substantially constant take-off level collective pitch until reaching this higher Mu level, then
decreasing the collective pitch in accordance with the curve as the Mu increases beyond this higher Mu level to a selected even higher Mu level; then
maintaining the collective pitch substantially constant as Mu increases more than the even higher Mu level; and
controlling the tilt of the rotor fore and aft to maintain a desired minimum rotational speed of the rotor.

9. A method of operating an aircraft having a rotor, a set of wings, and a propulsion source, comprising:
(a) determining a Mu vs collective pitch curve for the aircraft and programming a controller with the curve;
(b) pre-rotating the rotor, operating the propulsion source, and increasing a collective pitch of the rotor to cause the aircraft to lift off and commence forward flight;
(c) during the forward flight, tilting the rotor aft to cause the rotor to auto-rotate;
(d) measuring a true airspeed of the aircraft;
(e) measuring a rotational speed of the rotor;
(f) continuously calculating a Mu of the rotor based the airspeed of the aircraft and the rotational speed of the rotor; and
(g) with the controller varying the collective pitch according to at least part of the Mu vs collective pitch curve.

10. The method according to claim 9, wherein the curve of step (a) reaches a substantially constant level of collective pitch after which the controller maintains the collective pitch substantially constant as the Mu increases.

11. The method according to claim 9, wherein:
the Mu vs. collective pitch curve of step (a) has a maximum collective pitch at take-off;
step (b) comprises at take-off selecting a take-off collective pitch less than the maximum collective pitch defined by the Mu vs pitch curve, the take-off collective pitch corresponding to a particular Mu on the Mu vs. collective pitch curve; and
step (g) comprises maintaining the selected take-off collective pitch until the actual Mu reaches the particular Mu on the Mu vs. collective pitch curve, then varying the collective pitch according to at least a portion of the curve as the Mu increases beyond the particular Mu.

12. The method according to claim 9, wherein:
step (c) comprises controlling the amount of tilt of the rotor with the controller to maintain a selected minimum autorotational speed of the rotor.

13. The method according to claim 9, wherein the curve of step (a) is based on adjusting the collective pitch at a level versus Mu that limits flapping of the rotor to a selected range.

14. The method according to claim 9, further comprising:
disabling step (g) during forward flight and manually controlling the collective pitch.

15. The method according to claim 9, wherein steps (c) and (g) are coordinated to substantially unload the rotor.

16. The method according to claim 9, wherein:
the Mu vs. collective pitch curve of step (a) has a maximum collective pitch at take-off and a substantially constant minimum collective pitch that occurs at and beyond an upper level Mu;
step (b) comprises at take-off selecting a take-off collective pitch less than the maximum collective pitch defined by the Mu vs pitch curve, the take-off collective pitch having a corresponding higher level Mu on the Mu vs. collective pitch curve;
step (g) comprises maintaining the selected take-off collective pitch until the actual Mu reaches this higher level Mu, then varying the collective pitch according to the curve as the actual Mu exceeds this higher level Mu; and
step (g) comprises maintaining the collective pitch at the minimum collective pitch after the actual Mu reaches and exceeds an even higher level Mu.

17. The method according to claim 9, further comprising, during a short roll or zero airspeed landing, with the controller controlling an increase in collective pitch in order to maintain the required lift for the aircraft.

\* \* \* \* \*